Aug. 26, 1930.                B. F. FITCH                 1,774,429
            DOOR LOCKING DEVICE FOR DEMOUNTABLE VEHICLE BODIES
                    Filed Sept. 27, 1929      2 Sheets-Sheet 1
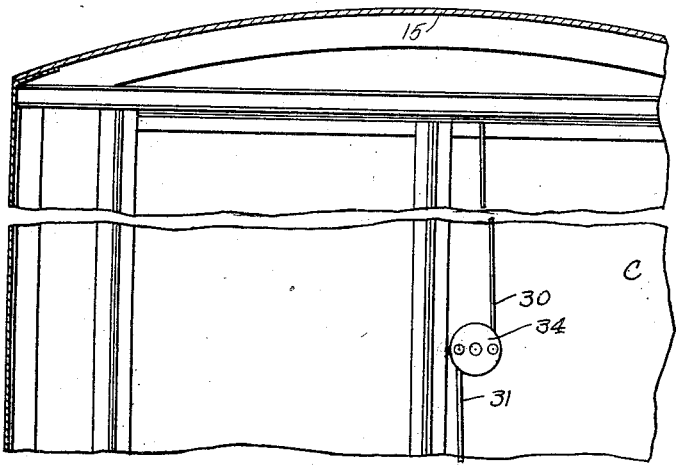
FIG_1
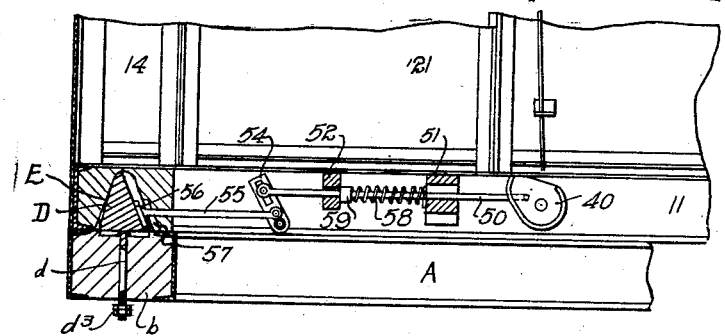
FIG_2
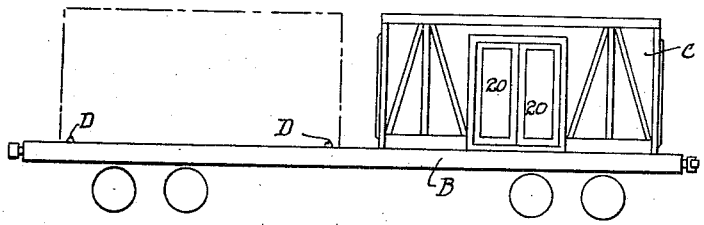
FIG_3
Inventor
Benjamin F. Fitch,
By Bakes, Golrick & Fear
                    Attorneys Aug. 26, 1930.   B. F. FITCH   1,774,429
DOOR LOCKING DEVICE FOR DEMOUNTABLE VEHICLE BODIES
Filed Sept. 27, 1929   2 Sheets-Sheet 2
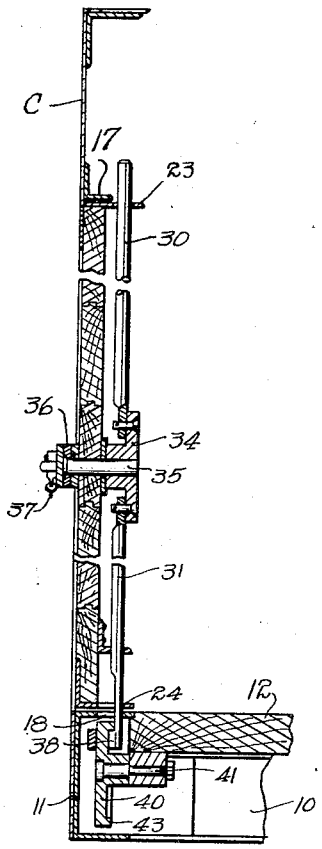
FIG_6
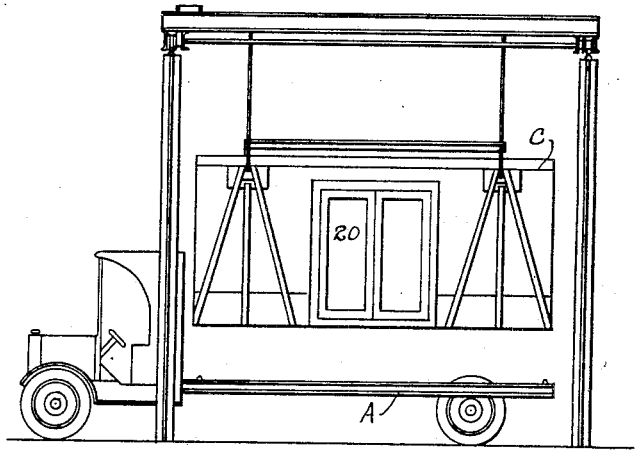
FIG_4
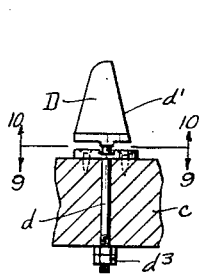
FIG_7
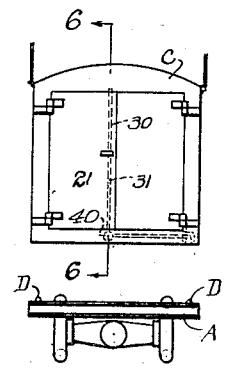
FIG_5
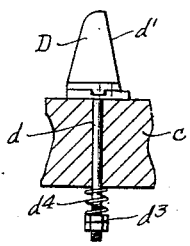
FIG_8
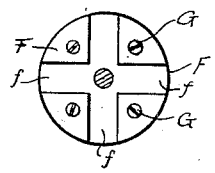
FIG_9
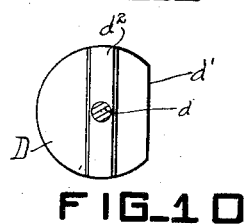
FIG_10
Inventor
Benjamin F. Fitch,
By Baker, Golrick & Feare,
Attorneys Patented Aug. 26, 1930

1,774,429

UNITED STATES PATENT OFFICE

BENJAMIN F. FITCH, OF GREENWICH, CONNECTICUT, ASSIGNOR TO MOTOR TERMINALS COMPANY, OF WILMINGTON, DELAWARE, A CORPORATION OF DELAWARE

DOOR-LOCKING DEVICE FOR DEMOUNTABLE VEHICLE BODIES

Application filed September 27, 1929. Serial No. 395,671.

This invention relates to an apparatus for handling freight by the use of removable automobile bodies or containers having doors, and is particularly concerned with controllable means on the vehicle adapted to coact with a container being placed thereon for automatically locking the doors or for leaving any door unlocked as desired.

More particularly, in accordance with my invention, I equip the removable bodies with door locking mechanism terminating in a suitable actuating member in the base of the body; I equip a vehicle which is to carry the body with a positioning member adapted to coact with a body, to hold it in position on the vehicle, and I so arrange the positioning member on the vehicle that it may be set into either of two positions, in both of which it will operate to position the body, but in only one of which it will coact with the lock actuator. Therefore, according to the setting of the positioning member, the door of the container corresponding thereto is automatically locked or left unlocked when the container is deposited on the vehicle.

My invention is illustrated in the drawings hereof and is hereinafter more fully explained and the essential novel characteristics are summarized in the claims.

In the drawings, Fig. 1 is a sectional end view partly broken away showing one of my containers mounted on a suitable support and having a door locking mechanism controlled by the positioning member on the support; Fig. 2 is a side elevation of a railway car carrying two of my containers properly position thereon; Fig. 3 is a plan of the parts shown in Fig. 2; Fig. 4 is a side elevation of a truck and container, together with suitable hoist apparatus suspending the container as it is being removed from or placed on the truck; Fig. 5 is an end view of the truck and body shown in Fig. 4; Fig. 6 is a vertical section through a container wall, this view being an enlarged section on the lines 6—6 on Fig. 5; Fig. 7 is a side elevation of my controlling positioning device mounted on a vehicle; Fig. 8 is a similar view showing a modified form of mounting; Fig. 9 is a top plan of a locating plate on the vehicle adapted to coact with the positioner; Fig. 10 is a bottom plan of the positioner.

In Figs. 1, 4 and 5, A indicates the frame of an automobile truck, and in Figs. 2 and 3 B indicates an ordinary railway flat car. The railway car and the truck are designed to cooperate with the same container or demountable body indicated by C.

To properly position the container on the car or truck, I provide each of these vehicles with upwardly extending projections D which are adapted to cooperate with downwardly facing recesses E in the bases of the containers. Each projection is provided with a shank $d$ passing through the supporting member of the vehicle, whereby it is located as hereinafter more fully explained. There are at least four of these projections or positioners corresponding to each of the four corners of the container. The projection D is preferably conical though rounded at the top and it coacts with a conical recess (preferably somewhat more flaring) in the base of the container. The result is that as the container is lowered into place, it becomes automatically positioned and brought into accurate registration by the upward projections.

As indicated in Figs. 1, 4, 5 and 6, each container may have a base comprising side sills 10, end sills 11 and a suitable floor 12. The container has side walls 13, end walls 14, and a roof 15, and is provided with hinged double doors. I have shown such pair of doors at 20 in the side walls of the containers, and at 21 in the end walls. These doors are hinged at their outer edges on vertical axes and may be provided with suitable hasps or other means by which they may be padlocked or sealed in the ordinary manner. They are also provided with automatic locking mechanism adapted to coact with the vehicle positioners as about to be explained.

One door of each pair is made at its free edge to overlap the free edge of the other door, so that the locking of the first mentioned door locks both doors. Two vertically extending bolts 30 and 31 are shown as being carried on the overlapping door, and as being adapted to extend beyond the upper and lower edges of such door section, and to engage behind parts of the frame for holding the doors shut. In the preferred form of construction these bolts are slidably guided near their free ends by guides 23, 24 carried by the doors. At their proximate ends, the bolts are pivoted to a disk 34 which is rigidly mounted upon a rock shaft 35. This shaft, as illustrated in Fig. 6, extends through the door section, and has a handle 36 rigidly mounted thereon at the outer end thereof. The handle when turned about the axis of the shaft, will rotate the member 34 and thereby will move the bolts with relation to the door, to lock or unlock the doors. A seal 37 or other device may be used for retaining the handle in closed position until the container is placed upon a truck or car.

When the bolts are being moved to the locked position, the upper bolt 30 passes behind a frame beam 17 while the lower bolt 31 passes through an opening in the door sill 18. My invention is concerned with automatic means for holding the bolts in locked position under certain conditions such as when the container is deposited upon a car or truck frame and to this end I have shown a cam plate 40, pivotally mounted at 41 to a block beneath the container floor, and having an inwardly turned flange 43 along part of the marginal edges, which flange portion is arranged to engage a shoulder 38 on the lower end of the bolt 31. The cam plate is normally in the position shown in Fig. 1, and thus has no effect on the bolts, but whenever it is swung on its pivot the flange will rise above the bolt shoulder 38 and hold it down.

In the embodiment shown, the cam plate 40 has connected to it, eccentric of its axis of rotation, a slidable operating rod 50. This rod is shown as passing freely through suitable guides 51 and 52 carried by the end sill 11 of the container. The other end of the rod has a pin and slot connection with a rock arm 54 and to this arm is pivoted a push bar 55, the other end of which terminates in a shoe 56 adapted to stand in the socket E or in a recess 57 at the side thereof. A spring 58 surrounding the rod 50 and bearing against a shoulder 59 thereon normally maintains the shoe 56 in the socket E and the cam 40 in idle position, as shown in Fig. 1.

Now when the container is being deposited on a support having the projection D set for cooperation with the shoe 56 such downward movement causes the shoe to be forced into the recess 57, thus rocking the arm 54, shoving on the rod 50 and thereby rocking the cam 40. This movement carries the flange 43 over the shoulder 38 on the bolt. The result is that, if the bolts have already been turned by hand to locked position, the flange 43 passing over the bolt shoulder prevents its being thereafter raised. On the other hand if the doors have been closed without the bolts being thrown, the cam flange 43 engaging the shoulder positively pulls down on the bolt 31 and rocks the disk 34 and thus shoves the bolt 30 up, effecting the locking.

It will be seen thus under the circumstances mentioned it is impossible to unlock the doors when the containers are in place on the support because the positioning projections D prevent any releasing movement of the cam. The construction therefore, functions not only to hold the bolt in locked position, but also serves to actuate the bolt in the event of failure by an operator to turn the latch after the doors have been closed, and I thus insure an automatic locking of the doors without necessitating any attention on the part of the operator other than that of closing the doors.

As so far described, the mere deposit of the container on the vehicle automatically locks any unlocked doors and automatically retains in position any that are locked. However it is desirable to provide means to enable any particular door to be left unlocked. This, for instance, enables package freight to be removed at way-stations directly from the container without requiring the removal of the container from the vehicle. As heretofore mentioned, I effect this release from locking by changing, from its normal position, one of the projections D which corresponds to the door it is desired to have unlocked.

As indicated in Fig. 3, the cam locking mechanism 50, 55 etc. for each door extends to a particular socket E, corresponding to a particular projection on the support. Each projection D is provided with a bevelled or flattened side wall $d'$. When the projection is turned so that such bevel $d'$ is in line with the shoe 56, then when the container is deposited on the vehicle, the shoe simply coacts with such bevel and the mechanism is not actuated and the door is left unlocked thereby. This is illustrated in Fig. 1 of the drawings. On the other hand when the projection D is in the normal position, the pair of doors controlled by the bar 55 is automatically locked upon the deposit of the container.

To enable the positioner D to be readily set as desired, with its bevel registering or out of registration with the lock actuator 56, and at the same time to insure its being effectively held in any given position I have provided the mounting illustrated herein, which is the essential feature of this particular application. That is to say, I provide the projection D with a single axial shank $d$ rotatably mounted in its support, which may be a corner block or cross sill $b$ in a truck frame or it may be the car floor $c$, as indicated in Figs. 1 and 7 respectively. Surrounding the shank of the positioner is a plate F which is shown as secured at the car floor $c$ by screws G or in the case of the truck as being made integrally with the corner block $b$. This plate in either case has in it four radiating grooves $f$ at right angles to each other, as shown in Fig. 9. On the underside of the projection D I form a diametric rib $d^2$ adapted to occupy either of the grooves $f$.

Accordingly whenever the projection is resting on the plate F with its rib occupying one of the grooves $f$, it will remain in that definite position, but can be reset by being lifted and given a quarter turn. The shank $d$ is slidable upwardly in the vehicle member but its movement is limited by the nuts $d^3$. If desired, a spring $d^4$ may be provided to prevent possible inadvertent displacement of the projection when idle.

It will be seen that by employing the grooved plate either as a separate member attached to the vehicle floor or as an integral part of the floor structure, I effectively hold the positioning member in its active or inactive position and at the same time enable it to be very readily changed when the container is not on the vehicle. Accordingly before the container is deposited, the operator determines which, if any, door is to be left unlocked and positions the controlling projection accordingly. Thereafter the container is simply lowered into place. When a vehicle carries a container with a selected door unlocked (so far as the automatic mechanism is concerned) this free door may be released by unlocking its padlock or breaking its seal and the desired portion of the contents removed manually without changing the position of the container on the vehicle. When however, the container is not intended to be opened between terminal points equipped with hoisting mechanism, all of the projections are left in their locked position, so that all the doors are automatically locked as soon as the container is deposited on the vehicle.

As heretofore stated, the present invention is concerned primarily with the means for holding the adjustable positioner. For broad claims on such adjustable projection controlling a door locking device, reference should be made to my copending application No. 352,937 filed April 6th, 1928. Reference should also be made to my prior Patent No. 1,685,356 granted September 25th, 1928 for claims on the locking mechanism carried by the container and its combination with a predetermined form of supporting surface.

I claim:—

1. The combination of a container having a door and mechanism for automatically locking the door, a support for the container having a device to coact with said mechanism and control it according to the position of said device, said device being rotatably mounted on the support, and means for holding said device in different positions.

2. The combination with a vehicle, of a container adapted to be carried thereby, door locking mechanism on the container, a device on the vehicle for controlling said mechanism, said device being rotatably mounted on the vehicle and means for holding said device in a plurality of fixed positions.

3. The combination with a container having door locking mechanism, of a vehicle adapted to carry the container, an upstanding projection on the vehicle adapted to coact with the door locking mechanism of the container, said upstanding projection having a shank rotatably mounted on the vehicle, and cooperating means carried by the projection and the vehicle for holding the projection in either of two positions, one of which renders the door locking mechanism active and the other of which renders it idle.

4. The combination of a container having door locking mechanism, a cooperating vehicle having a projection, said projection having a downwardly extending shank journalled in the vehicle, coacting shoulders on the upper side of the vehicle and the underside of the projection respectively to hold the projection in either of a plurality of positions, said projections presenting different faces to the door locking mechanism in such plurality of positions, whereby it may effect the locking or leave the locking idle as desired.

5. The combination with a support, a projection having a depending shank journalled in the support, the underside of the projection and the upper side of the support being equipped one with a radial rib and the other with a plurality of radial grooves any of which the rib may occupy, a container adapted to rest on the support and having door locking mechanism adapted to coact with a projection, the projection presenting different faces to the door locking mechanism in the different positions of the projection.

6. The combination of a support, a projection having a round shank journalled in the support, said support being equipped with a top plate surrounding the shank and coacting with the base of the projection, the upper side of the plate and the underside of the projection having a plurality of interlocking radial shoulders enabling the projection to be differently positioned and held on the plate, and means for limiting the movement of the projection away from the plate while allowing sufficient movement for the shoulders to clear.

7. The combination of a support, a projection having a controlling face, said projection having a shank rotatably mounted in the support, a plate on the top of the support having radial grooves in its upper surface, and a radial rib on the underside of the projection, the shank being slidable in the support to enable the projection to be lifted and turned.

8. The combination of a support, a conical projection, an axial shank rigid with the projection, said shank being vertically journalled in the support, a plate on the top of the support surrounding the shank, the bottom of the projection cooperating with the top of the plate, one of such cooperating members having a pair of radial grooves and the other a radial rib adapted to occupy either groove.

9. The combination of a container having a door and mechanism for automatically locking the door, a support for the container having a positioning device to coact with said container to hold it in place, said device also coacting with said mechanism and control it according to the position of said device, said device being rotatably mounted on the support, and means for holding it in different positions.

10. The combination with a container having a door, of a vehicle adapted to carry the container, an upstanding projection on the vehicle and a cooperative recess in the base of the container enabling the container to be held in position on the vehicle, door locking mechanism on the container having an actuating member adapted to extend into said recess and abut said projection, said projection being rotatably mounted on the vehicle, and means carried by the projection and the vehicle for holding the projection in either of two positions, one of which renders the door locking mechanism active and the other of which renders it idle.

In testimony whereof, I hereunto affix my signature.

BENJAMIN F. FITCH.